United States Patent Office 2,798,835
Patented July 9, 1957

2,798,835

NEWCASTLE DISEASE AND INFECTIOUS BRONCHITIS VACCINES AND PRODUCTION THEREOF

Floyd Stephen Markham, Nanuet, and Herald Rea Cox, Suffern, N. Y., assignors to American Cyanamid Company, New York, N. Y., a corporation of Maine No Drawing. Application January 18, 1954,
Serial No. 404,781

11 Claims. (Cl. 167—78)

This invention relates to the vaccination of animals or humans with a live virus vaccine which is inhaled, the vaccine, and its preparation.

A vaccine is a product consisting in whole or in part of infectious agents, living or dead, which is employed for the prevention or treatment of disease. In current therapeutic procedures the use of a living virus is preferred in many instances because it gives a superior and more dependable result and is more economical. In vaccination, which is the introduction into the tissues of the individual of the vaccine, it has been customary to administer the vaccine to the subject, including both humans and animals by means of injection, or by puncture, or by rubbing or scratching into the skin or mucous membrane, or by dropping into the nose or throat, or by instillation into the eye. Such methods require the individual treatment of the subjects and in many instances are undesirable because of peculiar complications inherent in the particular vaccine being used or its method of administration.

In the treatment of large numbers of subjects such as poultry, the time required to individually handle and treat a large number of individual fowls renders vaccination comparatively expensive. For example, in the past it has been customary to treat poultry with a live virus for vaccination against Newcastle's disease and infectious bronchitis by an intranasal method involving capturing the individual bird and emplacing a drop of the desired vaccine in the nasal passages of the bird, or by dropping the material into the eye of the bird. Sometimes these or other vaccines are administered by wing-web puncture, that is by dipping a needle into the vaccine and sticking the needle through the wing-web of the bird, thereby depositing a portion of the vaccine in the wing-web tissues.

These methods are effective, but are relatively expensive. At times, handling the birds will interfere with egg production, or cause other complications.

Attempts have also been made to vaccinate poultry by spraying an aqueous vaccine into the air which is breathed by the birds. This method has the advantage of saving time and labor because the birds may be caged in a group and treated rapidly. Unfortunately, the exact degree of dispersion of the spray and the exact potency of the virus in the vaccine being used is critical. A considerable portion of the vaccine is wasted because spray particles containing the virus fall on the walls or floors of the chamber or the plumage of the birds, and the particles are effectively removed from circulation and lost. Furthermore, particles which are too large settle too rapidly, and particles which are too small penetrate too deeply into the respiratory tract. For example, particles of the size which are delivered by a nebulizer (DeVilbiss Number 40), reach the pulmonary alveoli and are retained there. Hence this type of spray or fog may infect the entire respiratory surface, a circumstance which is likely to prove embarrassing to chicks which have no passive immunity to cushion the effects of such a massive infection.

While theoretically, such a method is useful, in field experiments, under the actual conditions of use, it is impossible to get unskilled farmers to use the meticulous care necessary to insure that the spray particle size is within an effective range. Even vaccination by itinerant "experts" who sell their services to farmers is likely to be associated with breaks in immunity and give results which can not be relied upon because the spray particles are not of the required size and potency. Further, the equipment used, and the travel of the operating personnel between flocks may spread other infections. The spray method of vaccinating is potentially successful, but frequently fails under field conditions.

It has now been found that a live virus as a living organism may be dried by conventional means, using low temperatures and drying from the frozen state, to prepare a live, dry virus containing material and this live, dry virus containing material may be ground without killing the virus to a particle size within the range of from approximately 10 to 50 microns, and these virus containing particles, forming the vaccine, dusted into a chamber containing the subjects, and by inhalation, the subjects receive the proper dosages of the vaccine.

As a matter of convenience, it is usually desirable that the vaccine be diluted with an inert diluent or excipient so that the amount of material to be suspended in the treatment chamber may be more easily handled and dispensed.

With the concentrated vaccine, about 0.5 milligrams per bird is an effective dose. In large pens of birds, this quantity is so small that special dusters are required to uniformly spread the vaccine over the birds. It is more convenient to use a diluted vaccine and commercially available dusters.

By the choice of vaccine particle size within an average range of 10 to 50 microns it is found that the vaccine remains suspended for a sufficient length of time for the vaccine to be inhaled by the subjects, and the particles are large enough so that the individual particles do not penetrate too deeply into the respiratory passages, and a small area of respiratory surface is in contact with the vaccine, giving a uniform and satisfactory vaccination. In other words, the majority of the particles of the virus-containing material have a size not substantially less than 10 microns and those of the virus-containing particles most effective in inducing immunization have a particle size not exceeding approximately 50 microns. Thus, while larger virus-containing particles may be present, those substantially larger than 50 microns are not largely effective in inducing immunization.

Further, in the vaccination of poultry, the dry particles which are not immediately inhaled remain suspended in the air or fall onto the plumage of the birds and are again suspended by the motion of the birds, so that even if some of the birds are not contacted by the original dispersion of the vaccine they are protected by inhaling the resuspended particles, resuspended by the motion of the birds.

Further, the quantities of vaccine found necessary for optimum results are approximately the same as are normally used for intra-nasal, conjuctival or wing-web vaccination.

The time and effort saved by suspending the live virus vaccine as a dust in the air for administration to the birds, rather than the capture of and individual treatment of each bird, renders vaccination by this method of tremendous economic importance in a highly competitive industry.

Various types of vaccines may be suspended as a dust. The method is particularly useful with Newcastle disease and infectious bronchitis in poultry. The vaccine itself may be prepared by growing a particular strain of the virus in chicken embryos. Usually an attenuated virus of low virulence is preferred. For example, with Newcastle disease the so-called B–1 strain of Hitchner and Johnson described in Veterinary Medicine, vol. 43, pp. 525–530 (1948) makes a desirable vaccine. It is sufficiently attenuated that it does not cause undesirable effects in the poultry and at the same time induces immunization.

The method of preparing the vaccine is in accordance with the conventional practice of growing the desired strain in a chicken embryo, selecting that portion of the chicken embryo which contains the desired virus, and suspending the virus in a suitable medium, freezing and removing the water, thereby giving a dried material. The dried vaccine such as has been sold in commercial practice may be used as a starting material for our invention. The dry vaccine is ground to an average particle size of 10 to 50 microns. If the material is markedly less than 10 microns, it penetrates too deeply into the respiratory tract so that undesirable results are obtained. If the average particle size is above about 50 microns, the material does not penetrate into the respiratory pasages in sufficient quantity to give reliable vaccination.

The material may be ground either in a tissue grinder or with the aid of glass beads in a shaking machine. The grinding may be done dry but is more conveniently done by suspending the material in an inert, non-flammable, non-explosive, non-toxic liquid. The chlorofluorinated lower alkanes are particularly satisfactory for this purpose. These materials are sold under the commercial designations of "Freon." The volatility of the liquid varies depending upon whether a methane or ethane derivative is used and the degree of substitution by chlorine and fluorine. The completely halogenated compounds are particularly useful and it is preferred to use one which, while comparatively volatile is still liquid at room temperature. 1,1,2-trichloro-1,2,2-trifluoro ethane, sold as "Freon 113," is very satisfactory as the vaccine may be suspended in this solvent and ground to give the desired particle size, and then the "Freon" may be removed by evacuating a chamber containing the vaccine, thus giving a completely dry, ground vaccine the potency of which has not been lowered by the grinding treatment. Either the dry Newcastle disease or infectious bronchitis virus containing residues used for preparing vaccines may be ground in this fashion. Dry grinding, as for example, in a ball mill, is also satisfactory but normally not as convenient.

The vaccine may be mixed with a diluent either while it is suspended in the "Freon" of after the "Freon" has been removed. The carrier should be an inert, non-flammable, non-explosive, non-toxic, non-irritating, substantially static-free, flowable, non-hydroscopic powder. Such materials as talc, diatomaceous earth, corn starch, lignin powder, bentonite, or pyrophyllite make excellent diluent dusts. It is preferred that the diluent be of approximately the same average particle size as the vaccine itself.

The potency of the vaccine is measured in embryo lethal doses ($ELD_{50}$) which is a quantity of material which when suspended in 0.2 milliliters of aqueous diluent and injected into the chorioallantoic sacs of 9 to 12 days incubated chick embryos will kill or infect 50% of them. The material is injected in 5 eggs, than after an additional 6 days incubation the eggs are checked to see if the embryo has been killed, or if the B–1 strain is used, to see if the allantoic fluid has the ability to agglutinate red blood cells in which case it is counted with the killed embryos. With field strains of Newcastle virus, the deaths are uniform after 72 to 96 hours. The $ELD_{50}$ is calculated by the method of Reed-Meunch, American Journal of Hygiene, 27, 493–497 (May 1938).

A vaccine to provide an effective dose when applied to the nostril of a bird must titer approximately $10^{-4}$ $ELD_{50}$ doses per cc., usually expressed as $ELD_{50}$ $10^{-4}$, and preferably should not run over $10^{-8}$. A product which titers from $ELD_{50}$ $10^{-5}$ to $10^{-8}$ is preferred for use in preparing the dust. With infectious bronchitis virus, and $ELD_{50}$ titer from $10^{-1}$ to $10^{-5}$ is preferred. With other vaccines, other concentrations are within the useful range.

The Newcastle disease vaccine is particularly useful for experimental work as it is easy to determine the effect of the Newcastle disease vaccine because the Newcastle disease virus is capable of agglutinating chicken red blood cells. On the basis of this, a hemagglutniation-inhibition test has been developed for the rapid, specific diagnosis of Newcastle disease. The principle of the hemagglutination-inhibition test is that in the presence of specific Newcastle disease antibodies, Newcastle disease virus is rendered incapable of agglutinating chicken red blood cells. A certain amount of virus is required to agglutinate a red cell, and therefore the number of cells that are agglutinated depends on the amount of virus present. In the hemagglutination-inhibition test, the Newcastle disease virus is mixed with chicken red blood cells and the serum sample to be tested for antibodies. A positive hemagglutination-innhibition test, that indicates no agglutination of the red cells, demonstrates the presence of specific Newcastle disease antibodies. This means either a present infection or an immunity in the bird from which the blood sample was drawn. Variations of this test may be used, one method is described in detail as the Official U. S. Department of Agriculture, Bureau of Animal Industries Method set forth in "The Hemagglutination and Hemagglutination-Inhibition Tests for the diagnosis of Newcastle Disease" by the U. S. Department of Agriculture, Agricultural Research Administration, Bureau of Animal Industry, Pathological Division, October 21, 1946. Another satisfactory method is the Lederle method which is described in the instruction leaflet with the Newcastle Disease Diagnostic Antigen sold by Lederle Laboratories. The results of these methods are consistent. By the use of this diagnostic method, it is possible to very easily determine which birds have an effective vaccination, and to determine the utility of a particular method of vaccination.

The present method is particularly unusual in that it is the first time that an anhydrous aerosol of a living organism appears to have been used for vaccination.

Inhalation methods have been used for the administration of antibiotics, as for example, as described in U. S. Patents 2,533,065 and 2,533,066 to G. V. Taplin et al., December 5, 1950, but such methods have not been used with living organisms.

Whereas our method of administration is particularly useful with respiratory diseases of fowls, it may also be used in other animals and with other diseases such as canine distemper, hepatitis, hog cholera, influenza, mumps, measles, and others.

*Example 1*

A portion of frozen and dried vaccine residue of chicken embryo origin containing infectious bronchitis virus, strain D–G, (from the University of New Hampshire), was ground in a tissue mill in the presence of 5 milliliters of trichlorotrifluoro-ethane ("Freon 113") to an average particle size of 20 microns. The trichlorotrifluoro-ethane was removed by vacuum. A 50 milligram portion of the ground powder was combined with 150 milligrams of talc. A second talc virus composition was prepared from Newcastle Disease vaccine which had been obtained from chicken embryos using the Blacksburg B–1 strain and similarly ground. A third composition was prepared consisting of 50 milligrams of each of the two virus preparations and 100 milligrams of talc. Groups of 25 baby chicks were confined in cardboard cartons and with a hand operated duster, the portions of the above-prepared vaccines were sprayed over the chicks, the birds being confined for 15 minutes. The three groups of birds were then returned to three separate decks of a brooder and to each group were added 7 marked and unexposed contact birds from the same hatch. At the time of use, the Bronchitis vaccine had a tilter of $10^{-3.75}$ and the Newcastle vaccine a titer of $10^{-7.37}$. Twenty-three days after vaccination, blood samples were collected from the birds which had been vaccinated by dusting with the combined viruses, and hemagglutination-inhibition tests showed that of 23 birds vaccinated, 1 had a titer of 16, 6 of 32, 9 of 64, 4 of 128, and 3 of 256. The unvaccinated birds which were in contact with the birds which had been vaccinated, had titers: 1 of 0, 1 of 16, 3 of 32, and 1 of 128. Serum neutralization tests were performed with these same blood samples to determine the response to the infectious bronchitis virus in the birds which had been treated with the combined vaccine. The neutralization indices found on 10 serum samples ranged from 1.4 to 4.2. The average was 2.7. On the day following the collection of the blood samples, all of the surviving birds in the 3 groups were challenged intranasally with the Boney strain of Newcastle virus. Of those tested which had been vaccinated with infectious bronchitis vaccine alone, 21 of the 23 died, whereas of those which were in contact with the dusted birds but were themselves undusted 6 out of 6 died; of the birds vaccinated with the Newcastle vaccine alone by dusting, 0 out of 22 birds died, and 0 out of 7 of the undusted contacts died. Of those vaccinated with the combined vaccine, 0 out of 22 vaccinated by dusting died, and none of the undusted contacts died. Of the control group, 18 out of 20 died.

It will be noted that of those vaccinated against Newcastle disease, satisfactory results were obtained in each instance, not only on the birds which were themselves dusted but also on the birds which were placed in contact with dusted birds and which received their vaccination solely through the resuspension of dust particles retained on the feathers of the dusted birds and which had been later resuspended.

The stability of the vaccine in the diluent also proved to be good. After 49 days at 25° C., the Bronchitis vaccine had a titer of $10^{-2.78}$ as compared with $10^{-3.75}$ initially, whereas the Newcastle vaccine had a titer of $10^{-6.5}$ as compared with $10^{-7.37}$ for the original.

*Example 2*

In a field trial, samples were prepared containing 250 milligrams of frozen and dried cake of chicken embryo origin vaccine which had been ground to an average particle size of 30 microns in the presence of trichlorotrifloro-ethane, and then diluted to a final weight of 2 grams with respectively talc, bentonite, diatomaceous earth, corn starch, and pine wood lignin, of the same average particle size. Pens of 250 birds each were treated with these vaccines by hand operated dust pumps at the rate of 2 grams of the diluted vaccine per pen, giving an equivalent of 250 milligrams of active virus component for each pen, or one milligram for each bird which is equivalent to approximately twice the normal intranasal dose. Three weeks after vaccination by this dusting, 197 representative birds were given blood tests and challenged. Approximately 93% of the birds were found to be hemagglutination-inhibition test positive as compared with 1.2% before dusting. There appeared to be no significant differences between the various diluents tested.

After challenge with a virulent strain of Newcastle disease virus, only 3 of 197 vaccinated birds died, whereas 80% of a control group succumbed. It thus appears under practical field conditions, the method gives satisfactory results.

*Example 3*

Commercial strains of Newcastle disease and infectious bronchitis virus were grown in chicken eggs, and the separated fluid dried after freezing, in accordance with standard practice for the production of intranasal vaccines. One gram of the dried residue of each was mixed with four milliliters of trichlorotrifluoroethane, and ground on a shaking machine with glass beads until the average particle size was about 30 microns. Portions of three grams each of dry sterile pyrophyllite were placed in sterile vials, and to each vial was added a portion of each of the vaccine concentrates in the trichlorotrifluorethane such that 250 milligrams of each solid vaccine concentrate was added to each vial. The vials were placed in a vacuum oven and the solvent removed. A portion of dye was placed in each of the vaccines before drying, Rhodamine B in the Newcastle disease, and Brilliant Blue in the infectious bronchitis, for positive indentification. After the removal of the solvent, the vials were shaken until uniformly mixed, as shown by uniform coloration. The use of the dye in the concentrate acts as a means of positive identification, and insures that the mixing is uniform.

The diluted vaccines were used to vaccinate six week old chicks susceptible to both diseases. 50 six week old sex-linked crosses were placed in 10 by 12 foot colony houses, of approximately 650 cubic feet capacity, and dusted with a hand dust pump with the vaccine.

On the basis of 0.50 milligrams of the dried concentrate forming a normal intranasal dose of each vaccine, birds were treated with such a quanttiy of diluted vaccine as to contain respectively, 0.5, 1.0, 1.5, and 2.0 doses of each vaccine, the birds were allowed to remain in the same colony house in which treated. After 18 days, the neutralization index for the I–B virus on a pool of 3 birds per house was greater than 3.4. The geometric mean titers for the houses 18 days after vaccination for the H–I test were respectively, 238, 168, 314, and 512. At the end of 8 weeks, the titers on the same test were respectively 16, 84, 111, and 111.

These tests show satisfactory immunization response to both virus components of the mixed vaccine. The immunity was confirmed by challenge.

The ease of immunizing against both diseases at the same time is commercially very important. If desired, separate vaccines may be dusted into the colony houses simultaneously or sequentially if convenient. The use of dyes for identification assists the farmer in preventing confusion of the various vaccines, and speeds the vaccination.

Other experiments show that 0.5 milligrams of dry vaccine per bird applied broadcast as a dust gave approximately the same degree of protection as is given by introducing the same amount of vaccine directly into the nose or eye of the birds.

It is most remarkable that the dust application should not require more of the vaccine than would be required by direct administration into the nose or eye of the bird.

Intranasal administration presently costs at least one cent per bird as the maximum vaccination rate is 500 birds per man per hour, whereas the novel method of dust vaccination permits this rate to be increased at least 6 to 10-fold without increasing the cost of the vaccine, thus markedly decreasing the labor costs in vaccination.

We claim:

1. An inhalable, substantially dry, live virus vaccine comprising substantially dry particles containing at least one species of a substantially dry, avirulent, live virus selected from the group consisting of Newcastle disease virus, infectious bronchitis virus and mixtures of the same dispersed in a substantially dry, inert, non-inflammable, non-explosive, non-toxic, non-irritating, substantially static free, flowable, non-hygroscopic, solid diluent, said particles which contain said virus being obtained from the propagation medium in which said virus is prepared and having an average particle size in the range of between about 10 to 50 microns with the majority of the particles having a size not less than 10 microns and the particles effecting immunization having a size not exceeding approximately 50 microns.

2. An inhalable, substantially dry, live virus vaccine as in claim 1 wherein said virus is a substantially dry, avirulent, live, chicken embryo-origin virus of Newcastle disease.

3. An inhalable, substantially dry, live virus vaccine as in claim 1 wherein said virus is a substantially dry, avirulent, live, chicken embryo-origin virus of infectious bronchitis.

4. An inhalable, substantially dry, live virus vaccine as in claim 1 wherein the virus components of said vaccine are a combination of a substantially dry, avirulent, live, chicken embryo-origin virus of Newcastle disease and a substantially dry, avirulent, live, chicken embryo-origin virus of infectious bronchitis.

5. An inhalable, substantially dry, live virus vaccine comprising substantially dry particles containing at least one species of a substantially dry, avirulent, live virus selected from the group consisting of Newcastle disease virus, infectious bronchitis virus, and mixtures of the same dispersed in a substantially dry, inert, non-inflammable, non-explosive, non-toxic, non-irritating, substantially static free, flowable, non-hygroscopic, solid diluent, said particles which contain said virus being obtained from the propagaation medium in which said virus is prepared and having a particle size in the range of between about 10 to 50 microns.

6. An inhalable, substantially dry, live virus vaccine comprising substantially dry particles containing at least one species of a substantially dry avirulent live virus selected from the group consisting of Newcastle disease virus, infectious bronchitis virus and mixtures of the same dispersed in a substantially dry pyrophyllite diluent, said particles which contain said virus being obtained from the propagation medium in which said virus is prepared, both said dry particles and said diluent having an average particle size in the range of between about 10 to 50 microns with the majority of the particle having a size not less than 10 microns and the particles effecting immunization having a size not exceeding approximately 50 microns.

7. An inhalable, substantially dry, live virus vaccine as in claim 6 wherein said virus is a substantially dry, avirulent, live, chicken embryo-origin virus of Newcstle disease.

8. An inhalable, substantially dry, live virus vaccine as in claim 6 wherein said virus is a substantially dry, avirulent, live, chicken embryo-origin virus of infectious bronchitis.

9. An inhalable, substantially dry, live virus vaccine as in claim 6 wherein the virus components of said vaccine are a combination of a substantially dry, avirulent, live, chicken embryo-origin virus of Newcastle disease and a substantially dry, avirulent, live, chicken embryo-origin virus of infectious bronchitis.

10. A method of preparing a substantially dry, inhalable, live virus vaccine comprising grinding a frozen and dried live virus residue in the presence of an inert, anhydrous, non-inflammable, non-explosive, non-toxic, non-irritating chloro fluoro lower alkane to an average particle size in the range of between about 10 to 50 microns, with the majority of the particles having a size not less than 10 microns and the particles effecting immunization having a size not exceeding approximately 50 microns, removing said chloro fluoro lower alkane by evaporation and uniformly mixing the thus ground virus residue with an inert, non-flammable, non-explosive, non-toxic, non-irritating, substantially static-free, flowable, non-hygroscopic, substantially dry, solid diluent, said live virus residue comprising substantially dry particles which contain a substantially dry, avirulent, live virus selected from the group consisting of Newcastle disease virus, infectious brnochitis virus and mixtures of the same, said dry particles being obtained from the propagation medium in which said virus is prepared.

11. The method of claim 10 wherein said chloro fluoro lower alkane is 1,1,2-trichloro-1,2,2-trifluoro ethane and said diluent is prophyllite having an average particle size in the range between about 10 to 50 microns with the majority of the diluent particles having a size not less than 10 microns.

References Cited in the file of this patent

UNITED STATES PATENTS

| | | |
|---|---|---|
| 1,503,864 | Vogt | Aug. 5, 1924 |
| 1,630,985 | Tival | May 31, 1927 |
| 2,065,762 | Stanley | Dec. 29, 1936 |
| 2,012,789 | Kraybill | Aug. 27, 1937 |
| 2,098,798 | Thornton | Nov. 9, 1937 |
| 2,143,088 | Rockwell | Jan. 10, 1939 |
| 2,163,996 | Flosdorf | June 27, 1939 |
| 2,533,065 | Tappin | Dec. 5, 1950 |

FOREIGN PATENTS

| | | |
|---|---|---|
| 506,095 | Great Britain | May 23, 1939 |
| 527,803 | Great Britain | Oct. 16, 1940 |

OTHER REFERENCES

Freezing and Drying, Report of a Symposium, June 1951, pp. 133–159.

Kliewe: Zentralblatt für Bakteriol., vol. 148, 1942, pp. 388–395.

Anglesio: Minerva Medica, May 26, 1948, pp. 515–521, p. 521, col. 1, last complete paragraph especially pertinent.

Behrens: Biol. Abst., Devember 1953, vol. 27, No. 12, p. 2999, abst. of article in Hoppe-Seyler's Zeitsch, Physiol. Chem., vol. 291, 1952, pp. 245–246.

Science News Letter, Aug. 19, 1950, p. 121.

Robertson: Science, June 4, 1943, p. 500.

Gorham et al.: Science, Jan. 22, 1954.

Brandly et al.: Am. J. Vet Res, July 1941, pp. 307 and 313.

UNITED STATES PATENT OFFICE

CERTIFICATE OF CORRECTION

Patent No. 2,798,835

July 9, 1957

Floyd Stephen Markham et al.

It is hereby certified that error appears in the printed specification of the above numbered patent requiring correction and that the said Letters Patent should read as corrected below.

Column 3, line 66, for "days" read -- day --; column 5, line 10, for "tilter" read -- titer --; line 34, for "22" read -- 20 --; column 7, line 32, for "propagaation" read -- propagation --; column 8, line 20, for "brnochitis" read -- bronchitis --.

Signed and sealed this 27th day of August 1957.

(SEAL)
Attest:

KARL H. AXLINE
Attesting Officer

ROBERT C. WATSON
Commissioner of Patents